United States Patent [19]
Courtois

[11] Patent Number: 5,742,676
[45] Date of Patent: Apr. 21, 1998

[54] CIRCUIT FOR TELEPHONE SET COMPRISING A LIGHT-EMITTING DIODE POWER SUPPLY

[75] Inventor: Fernand Courtois, Caen, France

[73] Assignee: U.S. Philips Corporation, New York, N.Y.

[21] Appl. No.: 721,913

[22] Filed: Sep. 27, 1996

[30] Foreign Application Priority Data

Sep. 29, 1995 [FR] France .................................. 95 11498

[51] Int. Cl.⁶ .................................................. H04M 1/72
[52] U.S. Cl. .................................................. 379/413; 396/399
[58] Field of Search .................................. 379/413, 399, 379/396, 387, 162, 163, 353, 373

[56] References Cited

U.S. PATENT DOCUMENTS

| | | | |
|---|---|---|---|
| 4,151,377 | 4/1979 | Whitaker | 379/382 |
| 4,564,729 | 1/1986 | Mills | 379/396 |
| 4,648,109 | 3/1987 | Boeckman | 379/396 |
| 4,723,279 | 2/1988 | Field | 379/396 |
| 5,170,429 | 12/1992 | Stocklin | 379/387 |
| 5,422,947 | 6/1995 | Azem | 379/396 |
| 5,570,421 | 10/1996 | Morishima | 379/396 |

FOREIGN PATENT DOCUMENTS

0700191A1  3/1996  European Pat. Off. ......... H04M 1/60

OTHER PUBLICATIONS

"TEA1062", Low Voltage Telephone Transmission Circuit With Dialler Interface, marketed by Philips, Sep. 1989.

*Primary Examiner*—Krista Zele
*Assistant Examiner*—Jacques M. Saint-Surin
*Attorney, Agent, or Firm*—Arthur G. Schaier

[57] ABSTRACT

A circuit comprising a transistor (T1) is connected in series to a resistor (RM) for measuring the line current; the whole is connected to the terminals (1,2) of the line. According to the invention, a light-emitting diode (18) is connected in series to a variable current source (20), the whole being connected in parallel to the emitter/collector path of the transistor (T1), and the variable current source, which receives a monitoring signal that represents the line current, produces a current that varies between a zero current and a maximum current for an average line current that varies between a low threshold and a high threshold.

11 Claims, 3 Drawing Sheets

5,742,676

CIRCUIT FOR TELEPHONE SET COMPRISING A LIGHT-EMITTING DIODE POWER SUPPLY

FIELD OF THE INVENTION

The present invention relates to a circuit for a device intended to be connected to a telephone line, comprising a power supply device for supplying power via the line of a light-emitting diode used as an operation indicator, the device also comprising a regulating transistor whose current path, connected in series to a line current measuring resistor, forms a circuit connected in parallel to the line, which regulating transistor determines a constant average value of voltage at the terminals of its main current path.

BACKGROUND OF THE INVENTION

A circuit comprising such a voltage regulating transistor and influencing the telephone line by current absorption is well known and widely used in the form of an integrated circuit, called transmission circuit, for example, a circuit referenced TEA1062 marketed by Philips. Itself being fed by the line current, the circuit ensures for the greater part the receiving and transmitting functions of a telephone set, in association with various external components of which the choice permits ensuring a regulation of the operating conditions of the telephone set. The current measuring resistor mentioned earlier forms part of these external components, and permits, for example, the regulation of the gain of the transmitter and receiver amplifiers as a function of the current absorbed on the line, and thus as a function of the line length.

The power supply via the line current of a light-emitting diode as an operation indicator poses certain difficulties when this diode is used in a telephone set which comprises a transmission circuit as indicated above, because the current flowing through this diode may call forth considerable disturbances in the operation of the telephone set if particular precautions are not taken.

More particularly, the supply current of the light-emitting diode must neither change the dynamic input impedance of the telephone set, nor change the gain regulation provided by the transmission circuit. Moreover, the relatively large voltage drop of a light-emitting diode, of the order of 2 volts, is liable to reduce the possible voltage excursion on the terminals of the line and, consequently, to introduce an unacceptable distortion of transmission signals or received signals.

Thus, the invention has for its object to provide a solution to the problem posed by the power supply of a light-emitting diode in a station which includes a transmission circuit, by proposing a circuit whose elements relating to the power supply of this diode are easily integrable with the transmission circuit. Such a circuit according to the invention has for its aim to make maximum use of the available current on the telephone line without nevertheless introducing significant disturbance of the operation of the station and, more particularly, without modifying the gain adjustments of the amplifiers or augmenting the distortion of the transmitted signals.

SUMMARY OF THE INVENTION

For this purpose, a circuit as defined in the opening paragraph is characterized, according to the invention, in that the power supply device comprises a variable current source connected in series to the light-emitting diode, the ensemble of these two elements being connected in parallel to the main current path of the regulating transistor, and in that the variable current source, receiving a monitoring signal derived from the voltage drop in the line current measuring resistor, is arranged for delivering a supply current which has a given nominal value when the average line current is equal to or higher than a current threshold and for not delivering when the average line current is lower than the said threshold.

The ensemble of the variable current source and the light-emitting diode forms a circuit connected in parallel to the main current path of the regulating transistor, so that the derived current in this circuit flows into the current measuring resistor. Thus, this resistor actually receives the total current absorbed on the line and, as a result, the gain controls of the transmitting and receiving amplifiers are not disturbed.

A variant of the invention provides a circuit as defined in the opening paragraph, characterized in that the power supply device comprises a variable current source connected in series to the light emitting diode, the ensemble of these two elements being connected in parallel to the main current path of the regulating transistor, and in that the variable current source, receiving a monitoring signal derived from the voltage drop in the line current measuring resistor is arranged for delivering a given maximum supply current when the average line current is equal to or higher than a first current threshold, for not delivering when the average line current is equal to or lower than a second current threshold, which is lower than the first threshold, and for delivering a variable supply current which varies with the average line current between the first and second current thresholds.

The fact that the current delivered by the variable current source has a value which varies as a function of the current available on the line forms an advantageous compromise between a clearly visible operation indicator lamp and maintaining essential functions of the set, which are ensured with priority when the available current on the line is too low to feed the light-emitting diode. Furthermore, turning off the light-emitting diode, or a weak light emission, also represents per se information about the state of the line which may be useful to the user.

Preferably, the value of the current delivered by the variable current source is a linear function of the average line current between the first and second current thresholds, so that the visual indication of the operation is proportional to the available line current when the second current threshold is exceeded.

According to a preferred embodiment of the circuit according to the invention, the variable current source comprises a current generator which can be adjusted via the monitoring signal, which generator produces on its output a current called control current in a load resistor, and an amplifier of the transconductance type of which an input is coupled to the load resistor and which delivers on its output a current which forms the supply current of the light-emitting diode, which is proportional to said control current.

This embodiment offers the advantage that the circuit section producing the control signal may be arranged for operating at very low current levels, so that it is not necessary to take these currents into account in the current measuring resistor. As regards the amplifier, on the other hand, the latter is intended to produce a significant supply current compared to the line current, so that there is provided that it is this current that passes through the current measuring resistor. A reference terminal of this amplifier and a terminal of the resistor called load resistor which, of necessity, must have the same voltage reference, are thus connected to the current measuring resistor.

The circuit according to the invention, as defined thus far, ensures optimum power supply of the light-emitting diode via an average current whose value depends in essence on the supply voltage of the line, on the line impedance and on the impedance of the power supply. However, in the case where the AC voltage signal transmitted on the line has a large amplitude, it may happen that the voltage on the terminals of the variable current source for a moment becomes insufficient for this power source to continue functioning in a suitable manner. This may in general call forth an unacceptable distortion of the transmission signal.

Therefore, according to a complementary embodiment of the invention, a switching of the variable current source is provided, so that this switching ensures that the supply current of the light-emitting diode is cut off as a function of the instantaneous value of the line voltage when this voltage becomes insufficient.

Indeed, according to this embodiment, the circuit according to the invention is characterized in that it further comprises a comparator receiving on its input the value of the instantaneous voltage drop at the terminals of the variable current source, which voltage drop can be compared to a voltage threshold, and in that the output of the comparator is coupled to a blocking device for blocking the variable current source which causes the suppression of the current delivered by this variable current source, when the instantaneous voltage drop at the terminals of the latter is lower than said voltage threshold.

A blocking device for blocking the variable current source may simply be formed by the load resistor whose voltage drop may be canceled by the output signal of the comparator. To avoid any oscillation of the circuit due to the cutting off of the current in the light-emitting diode, the comparator is preferably of a hysteresis effect type.

Finally, to prevent an abrupt voltage drop equal to the voltage drop of the light-emitting diode from occurring the moment its supply current is cut off, the invention advantageously provides that a resistor is connected in shunt to the terminals of the variable current source.

The invention likewise relates to a telephone set intended to be connected to a two-wire telephone line, comprising:

- a rectifier bridge which has two terminals, each one intended to be connected to one of the wires forming the telephone line, and a positive and a negative terminal between which the divider bridge delivers a positive voltage,
- a switch which has a first terminal connected to the positive terminal of the divider bridge and a second terminal,
- a module called interface module which has a first supply terminal connected to the negative terminal of the divider bridge, a second supply terminal connected to the second terminal of the switch and an output terminal intended to deliver a local supply voltage, which interface module is intended to transmit signals to the telephone line and therefore has an input terminal,
- a module called emitter module which has a first supply terminal connected to the negative terminal of the divider bridge and a second supply terminal connected to the output terminal of the interface module, and an output terminal intended to deliver a transmit signal, characterized in that the interface circuit comprises:

a circuit as described above, in which the current path of the regulating transistor, connected in series to the line current measuring resistor, forms a circuit inserted between the first and second supply terminals, the regulating transistor being controlled by the transmit signal coming from the transmitting module and received on the input terminal of the interface module, and a resistor and a capacitor connected in series between the first and second supply terminals, the node between the resistor and the capacitor forming the output terminal of the interface module.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
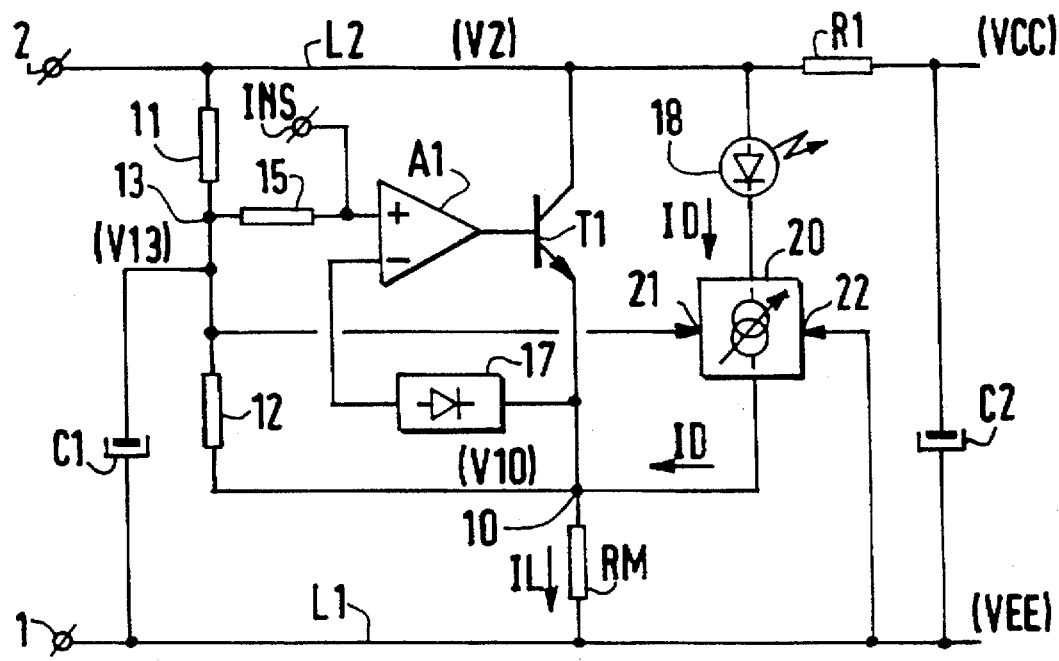
FIG. 1 shows a general and simplified electric circuit diagram of the circuit according to the invention.

The circuit for a telephone set shown in FIG. 1 is connected to two terminals 1 and 2 of a telephone line downstream of the usual overvoltage protection devices and of a diode bridge which ensures a fixed polarity at the ends of the line. Thus, terminal 1 corresponds to the negative wire to which is connected an end of line L1 which serves as a reference voltage VEE, while terminal 2 corresponds to the positive voltage wire to which is connected an end of the positive voltage line L2.

The circuit comprises in known manner a regulating transistor T1 of the NPN type whose current path, connected in series to a current measuring resistor of line RM, forms a circuit connected in parallel to the ends of lines L1 and L2. The link between the emitter of the transistor T1 and the resistor RM forms a node 10 which carries a voltage V10.

The transistor T1 determines a voltage whose average value is constant at the terminals of its emitter-collector path. For performing this function, a divider bridge formed by two resistors 11 and 12, connected in series, is inserted between the end of line L2 and the node 10. The center point of this resistor bridge 11, 12 forms a node 13 which is coupled to the non-inverting input of an amplifier A1 via an input resistor 15. The voltage of the node 13 is further stabilized by a capacitor C1 connected to the end of line L1 which is used as a voltage reference. The function of the input resistor 15 is to permit a recoupling of the transmission signal on a terminal INS which is connected to the non-inverting input of the amplifier A1.

In the absence of a transmission signal, the voltage at the node 13 is applied in practice to the non-inverting input of the amplifier A1. The inverting input of the amplifier A1 is coupled to the node 10 via a voltage shifter 17. This ensures that the voltage of the inverting input of the amplifier A1 is equal to the voltage of the node 10 augmented by one or various voltage drops of forward direction diodes.

By designating V17 the voltage difference produced by the voltage shifter 17, and V2 the average voltage of the end of the line L2, one may write:

$$V13-V10=(V2-V10).R12/(R11+R12)=V17$$

and conversely:

$$V2-V10=V17.(R11+R12)/R12$$

which justifies the fact that the regulating transistor T1 produces a substantially constant average emitter-collector voltage. The voltage V10 of the node 10 contains a DC component which, in known manner, is used for adjusting the gain of the transmitting and receiving amplifiers of the telephone set in an arrangement not shown in the Figure. The voltage V10 indeed corresponds to a line current measurement in the resistor RM and thus permits an estimation of the impedance of the telephone line and a compensation for its attenuation.

The end of line L2 is coupled to the end L1 acting as a reference, via a resistor R1 connected in series to a high-value storage capacitor C2. The resistor R1 very clearly determines the input impedance of the telephone set seen from the side of the line, this resistor having a value of the order of 600Ω. The other impedances connected to the line, for example, resistor 11, have a much higher value than R1 and lead to a negligible power consumption. The node between the resistor R1 and the storage capacitor C2 has a voltage VCC used for supporting the various functions of the other circuits than those described in the drawing Figure. There is observed in this respect that the current taken from this voltage source VCC does not flow in the current measuring resistor RM, whence the consumption on this voltage source is of necessity restricted to a small value.

The circuit described so far is known and used in an integrated transmission circuit designated TEA 1062 marketed by Philips.

With this integrated circuit, a known manner of supplying power based on line current to a light-emitting diode, consists of providing a fixed current source connected in series to said light-emitting diode, the whole being connected between the ends 1 and 2 of the telephone line.

It will be clear that this solution does not provide complete satisfaction, because the current of the light-emitting diode does not flow through the current measuring resistor RM and, consequently, the gain adjustments of the transmitting and receiving amplifiers are disturbed.

According to the invention, on the other hand, and according to FIG. 1, the power supply of a light-emitting diode 18 is ensured by a variable current source 20 which, connected in series to a diode 18, forms an ensemble connected in parallel to the emitter-collector path of the transistor T1. Therefore, the current D flowing through diode 18 passes through the current measuring resistor RM and is thus taken into account for the adjustments ensured by the voltage V10 of the node 10.

The variable current source 20 has an input 2I connected to the node 13 and another input 22 connected to the end of line L1. The voltage difference occurring between the input terminals 21 and 22 forms a monitoring signal which indicates the line current as was shown above, the voltage V13 of the node 13 is the sum of a voltage determined by the voltage shifter 17, and the voltage V10 of the node 10 shows a voltage drop proportional to the line current. The variable current source 20 is arranged for delivering a supply current ID to the diode 18 whose maximum value is determined when the average line current is equal to or higher than a first current threshold, and for not delivering when the average line current is equal to or lower than a second current threshold which is lower than the first threshold.

Between the second and first line current thresholds, the variable current source 20 supplies a current which varies progressively.

In a preferred embodiment of the invention, this variation is linear.

The coupling between the current delivered by the variable current source 20 and the emitter voltage of the transistor T1, which coupling is obtained by the current measuring resistor RM, leads to the fact that the supply current of the diode 18 is subtracted from the current the transistor T1 would deliver if such a diode were not supplied with power.

Thus, in the case where the line current IL is sufficient, the line current is divided between the diode 18 and the regulating transistor T1. This ensures optimum operation of the circuit as a function of the current available on the line, but achieves that a supply priority is given to a distortion-free signal use when the available line current is relatively low.

By way of example, the first line current threshold may be determined to be 75 mA, whereas the second threshold below which the variable current source 20 no longer delivers, can be determined to be a line current of 15 mA.

Figure 2:
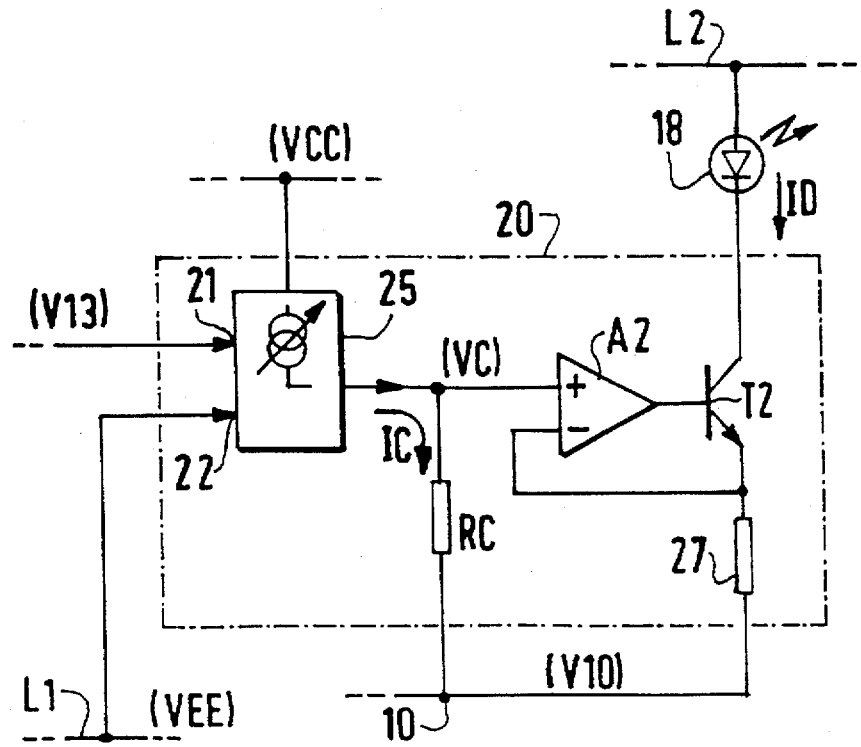
FIG. 2 shows a more detailed electric circuit diagram of part of the circuit of FIG. 1.

FIG. 2 shows the principle of an illustrative embodiment of a variable current source, such as source 20 in FIG. 1. In this Figure, like elements to those of FIG. 1 and having like functions are denoted by like reference characters.

The variable current source 20 is shown in a box of dash-and-dot lines. It comprises an adjustable current generator 25 which can be adjusted as a function of voltages applied to the inputs 21 and 22, the difference of which voltages being representative of the line current at the voltage shift close to device 17 (FIG. 1).

The adjustable current generator 25 produces on its output a control current IC which feeds a load resistor RC referred to the node 10, which carries the voltage V10. The voltage drop at the load resistor RC is applied to the non-inverting input of an amplifier A2 whose output controls an NPN transistor T2, the emitter of which transistor T2 being coupled in a negative feedback loop to the inverting input of the amplifier A2. A resistor 27 connects the emitter of the transistor T2 to the node 10, while the collector of the transistor T2 produces the supply current ID intended for the light-emitting diode 18.

The structure of the variable current source 20 offers the advantageous special feature that the adjustable current generator 25 can be supplied with power by the voltage source VCC if the current consumed by this generator remains so low as to be negligible compared with the line current. It is also possible to connect this generator 25 to the reference voltage VEE of the end of the line L1, without the current consumed by the generator being taken into account by the current measuring resistor RM (FIG. 1).

The transistor T2, on the other hand, delivers a current which is variable and relatively large compared with the total line current, so that its reference is the node 10 and this current is taken into account by the current measuring resistor RM. To ensure in a suitable manner the power amplifying function of the ensemble of amplifier A2 and transistor T2, the load resistor is also connected to the reference node 10. The ratio between the load resistor RC and the emitter resistor 27 of the transistor T2 determines the current multiplying factor of the control current IC which may be, for example of the order of 1000.

Figure 3:
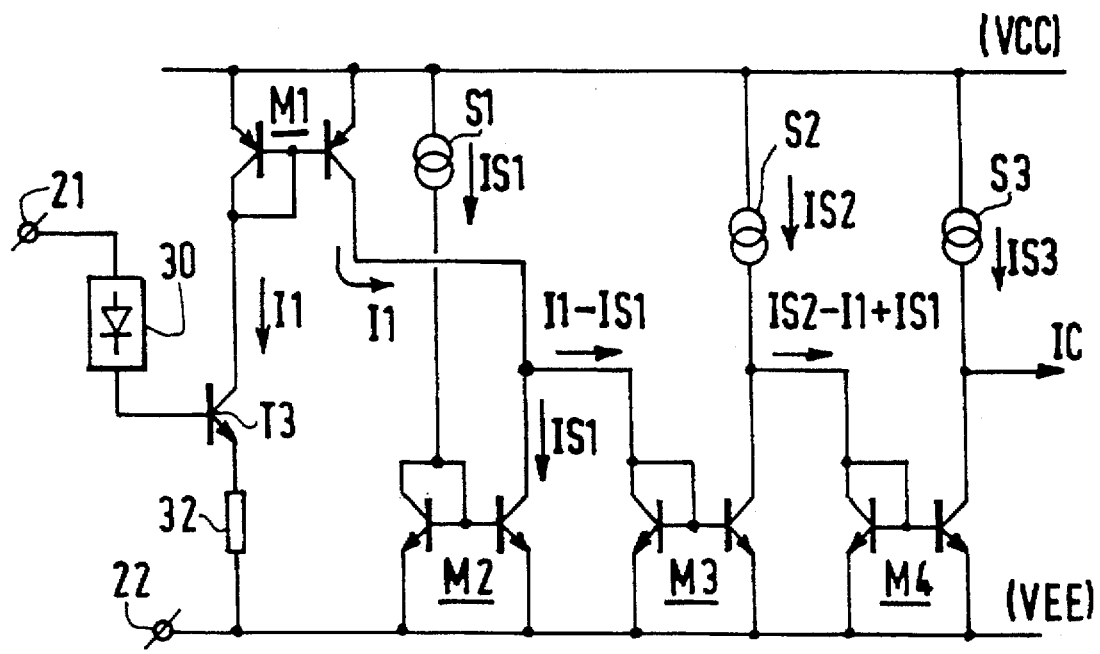
FIG. 3 shows the diagram of an illustrative embodiment of a current generator used in the circuit according to the invention.

A detailed illustrative embodiment of the adjustable current generator 25 is represented in FIG. 3. The control input 21 of this generator carries the voltage V13 of the node 13 which can be seen in FIG. 1.

As observed earlier, this voltage V13 is equal to the voltage V10 of the node 10, increased by a voltage difference which is determined by the voltage shifter 17.

A voltage shifter 30 is inserted between the control input 21 and the base of a transistor T3 of the NPN type, whose value is such that a voltage equal to the voltage V10 of the node 10 is obtained on the emitter of the transistor T3. This voltage V10 relative to the voltage VEE taken as a reference, represents the value of the line current at a scale given by the current measuring resistor RM. The emitter of the transistor T3 is coupled to the control input 22, which is no other than the reference voltage VEE, via an emitter resistor 32. By selecting a high value for the emitter resistor 32 relative to the current measuring resistor RM, a copy of the line current in the transistor T3 is obtained at a scale which may be considerably reduced, for example, by a factor of 3000.

The current I1 thus created, while discarding the loss due to the base current, is sent via a current mirror circuit M1 of PNP-type transistors to the output of a second current mirror circuit M2 whose input is fed by a current source S1 which delivers a current IS1. The current mirror circuit M1 and the current source S1 are fed from the supply point of voltage VCC as defined in the circuit of FIG. 1.

The output of the current mirror circuit M2 produces a current equal to the difference I1-IS1 which is obviously, in this struc a third current mirror circuit M3. Obviously, in this structure, the difference I1-IS1 cannot be negative and the current on the output of the current mirror circuit M3 is thus zero if I1 is lower than IS1, and positive if I1 is higher than IS1. Where I1 is a reproduction of the line current at a very small scale, the current IS1 of the source S1 represents the second current threshold at the same scale, below which the adjustable current generator 25 does not produce any current.

A current source S2 which delivers a current IS2 is coupled to the output of the current mirror circuit M3, the output of the ensemble offering a current of a value equal to IS2-(I1-IS1). This current is applied to the input of a fourth current mirror circuit M4 to whose output is applied the current IS3 of a third current source S3 according to a process which is analogous to the preceding current mirror circuits. Thus, the output of the current mirror circuit M4 offers a control current IC whose value is equal to IS3-IS2+(I1-IS1). When I1 is significantly higher than IS1, that is to say, when the line current is high, the difference IS2-(I1-IS1), which expresses the current on the input of the current mirror circuit M4, cannot be negative, so that the current IC has a value which is limited to the current IS3, which represents on a small scale the value of the current threshold beyond which the supply current of the light-emitting diode will be limited.

Moreover, in order that the current IC is zero when I1=IS1, it will be sufficient that the currents IS2 and IS3 produced by the current sources S2 and S3 are equal.

By way of example, the current IS1 may have a value of 5 µA whereas the currents IS2 and IS3 are determined to be 20 µA. In this example, the ratio between the emitter resistor 32 of the transistor T3 and the current measuring resistor RM is 3000. Thus, when the current I1 is equal to 5 µA, the line current really has the value of 15 mA, which corresponds to the current threshold on the basis of which the supply current of the light-emitting diode starts rising. The current IC is maximally limited to the current value IS3, that is, to 20 µA, which corresponds to a line current of 75 mA and represents the value of the line current threshold beyond which the light-emitting diode is supplied with DC current of 20 mA.

Figure 4:
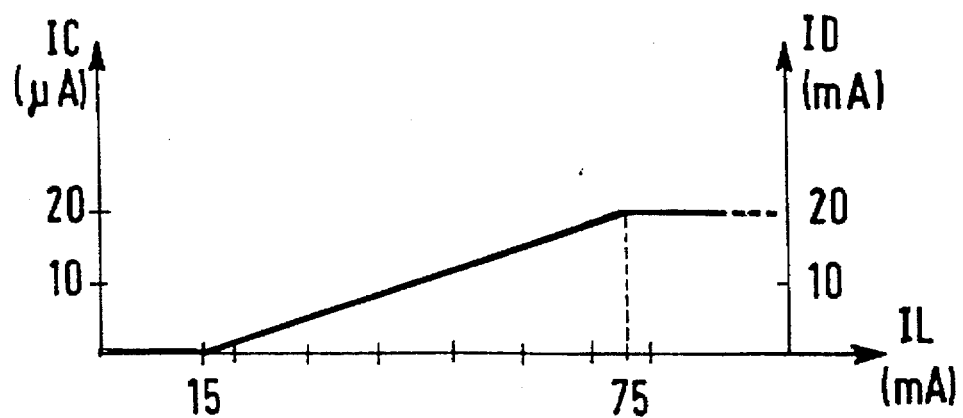
FIG. 4 shows a curve of the supply current of a light-emitting diode plotted against the current available on the line.

FIG. 4 shows the curve of the current delivered by the programmable current generator 25 plotted against average line current IL, while the current ID feeding the light-emitting diode has the same shape as the control current IC, but in a proportion that is 1000 times higher.

When reference is made again to FIG. 2, it will be noticed that the amplifier A2, the transistor T2 and the emitter resistor 27 form an amplifier of the transconductance type, which transforms the input voltage VC into an output current ID in a desired proportion, equal to 1000 in this example.

The circuit according to the invention as described so far with the aid of FIGS. 1 to 4, ensures optimum power supply to a light-emitting diode, while providing a priority power supply to the essential functions of the telephone circuit which relate to the transmission. The voltage drop in the light-emitting diode is relatively large, of the order of 2 volts, compared to the available voltage between the node 10 and the end of the line L2. The voltage difference on the terminal of the variable current source 20 is only 1 to 2 volts on average. While taking into account the AC signal present on the line, it may happen that the instantaneous voltage difference on the terminals of the variable current source 20 is insufficient for this source to operate suitably. Under these circumstances, an unacceptable distortion of the AC signal may occur.

Figure 5:
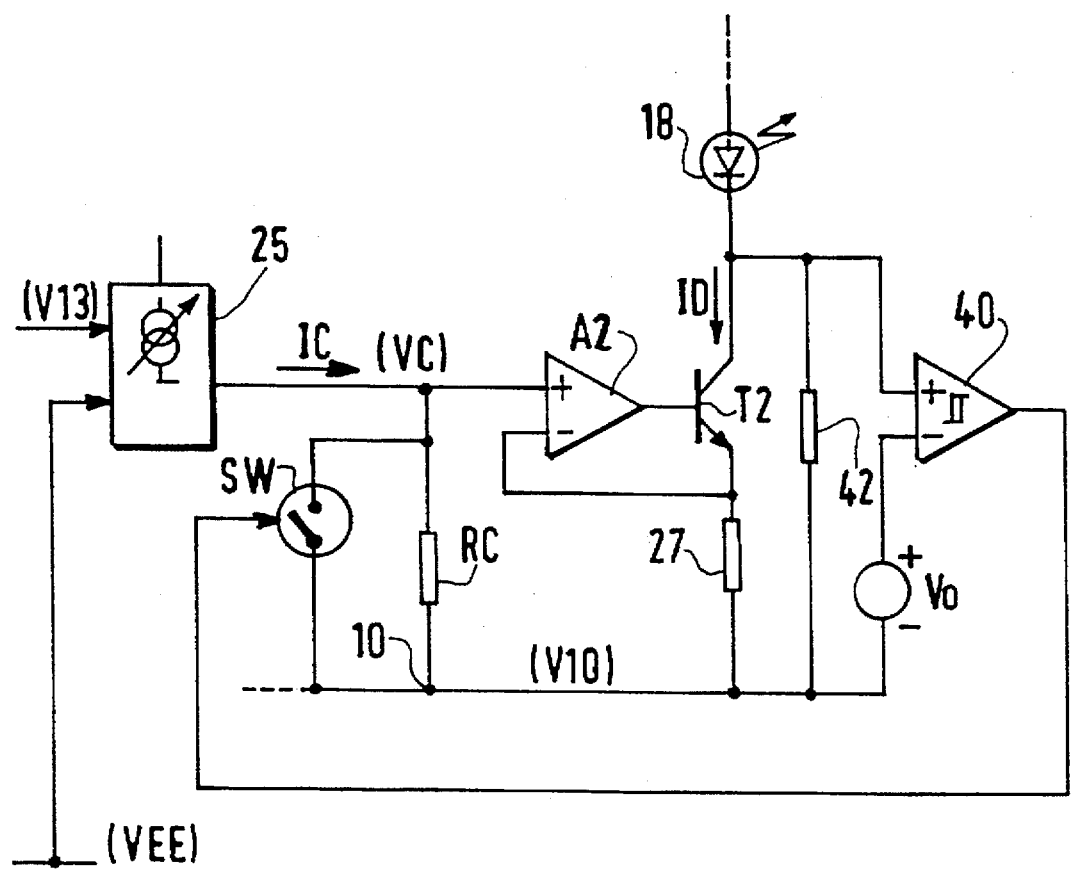
FIG. 5 shows the electric circuit diagram of a part of the circuit similar to that of FIG. 2, in an advantageous embodiment of the invention.

With the aid of FIG. 5 is described a complementary embodiment of the invention which makes it possible to interrupt the supply current of the light-emitting diode when the voltage difference on the terminals of the variable power supply source becomes insufficient in the course of time.

FIG. 5 again takes, in essence, the elements described with reference to FIG. 2, which elements, in so far they are like elements, are denoted by like references. The part of the circuit represented in FIG. 5 in essence distinguishes itself from the equivalent part shown in FIG. 2, because of the addition of a hysteresis comparator 40. To the non-inverting input of this comparator is applied the voltage of the collector of the transistor T2, which is compared with a threshold voltage Vo applied to the inverting input of this comparator. The output of this comparator 40 is coupled to a blocking device for blocking the variable current source, which device is formed in the example by the load resistor RC to which a switch SW is connected in shunt. According to a variant of an embodiment (not shown), it is the output of the comparator 40 that is connected to the load resistor RC and is liable to absorb the control current IC.

Thus, when the collector voltage of the transistor T2 is lower than the threshold voltage Vo, the control current IC can be directly deviated to the node 10 which causes the control voltage VC to be canceled.

The result is that the amplifier A2 controls the blocked transistor T2, and the supply current ID of the light-emitting diode 18 is canceled instantaneously. As the collector voltage of the transistor T2 has a tendency of rising again when the current in the diode 18 is canceled, it is useful providing a hysteresis, which is relatively high in the switching operation of the comparator 40, to avoid an oscillation.

According to an advantageous embodiment shown in FIG. 5, an additional resistor 42 is connected in parallel between the collector of the transistor T2 and the node 10, that is to say, to the terminal of the supply current source. Thus, too large a variation of the voltage drop in the diode 18 is thus avoided when the collector current of the transistor T2 is suddenly canceled. The value of the resistor 42 may be relatively high, and, for example, selected so that at the moment of the suppression of the current ID by the collector of the transistor T2, the current flowing through this resistor is only a fraction of the order of 1/200 of the current ID produced previously. When the supply current of the diode 18 is suppressed for a moment, an equivalent current to the suppressed current is instantaneously added to the current flowing through the transistor T1, which ensures the regulation of the line voltage.

Experimentally it has been found that such a current switching between the variable current source and the regulating transistor T1 does not produce measurable disturbance of the AC signal transmitted on the line, and that the measured distortion of this signal continues to be much less than 1%.

Figure 6:
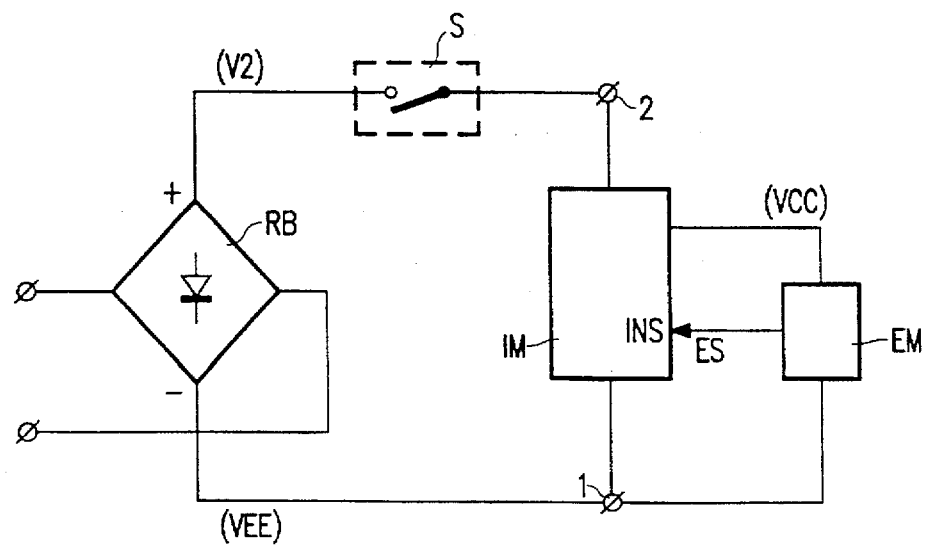
FIG. 6 shows a partial electric circuit diagram of a telephone utilizing a circuit according to the invention.

FIG. 6 represents diagrammatically a telephone which utilizes a circuit according to the invention. Such a telephone comprises:

- a rectifier bridge RB which has two terminals, each one intended to be connected to one of the wires forming the telephone line, and a positive and a negative terminal between which the divider bridge RB delivers a positive voltage,
- a switch S which has a first terminal connected to the positive terminal of the divider bridge RB and a second terminal,
- a module IM called interface module which has a first supply terminal 1 connected to the negative terminal of the divider bridge RB, a second supply terminal 2 connected to the second terminal of the switch S and an output terminal intended to deliver a local supply voltage VCC, which interface module IM is intended to transmit signals to the telephone line and therefore has an input terminal INS,
- a module EM called emitter module which has a first supply terminal connected to the negative terminal of the divider bridge RB and a second supply terminal connected to the output terminal of the interface module IM, and an output terminal intended to deliver a transmit signal, characterized in that the interface module IM, of which a simplified circuit diagram is represented in FIG. 1, comprises:
- a circuit 100 as described above, in which the current path of the regulating transistor T1, connected in series to the line current measuring resistor RM, forms a circuit inserted between the first and second supply terminals 1 and 2, the regulating transistor T1 being controlled by the transmit signal ES coming from the transmitting module EM and received on the input terminal INS of the interface module IM, and
- a resistor R1 and a capacitor C2 connected in series between the first and second supply terminals 1 and 2, the node between the resistor R1 and the capacitor C2 forming the output terminal of the interface module IM.

I claim:

1. A circuit in a device connected to a telephone line, comprising a power supply device for supplying power via the line of a light-emitting diode used as an operation indicator, the device also comprising a regulating transistor whose current path, connected in series to a line current measuring resistor, forms a circuit connected in parallel to the line, which regulating transistor determines a constant average value of voltage at the terminals of its main current path, characterized in that the power supply device comprises a variable current source connected in series to the light-emitting diode, the ensemble of these two elements being connected in parallel to the main current path of the regulating transistor, and in that the variable current source, receiving a monitoring signal derived from the voltage drop in the line current measuring resistor, is arranged for delivering a supply current which has a given nominal value when the average line current is equal to or higher than a current threshold, and for not delivering current when the average line current is lower than said current thresholds.

2. A circuit in a device connected to a telephone line, comprising a power supply device for supplying power via the line of a light-emitting diode used as an operation indicator, the device also comprising a regulating transistor whose current path, connected in series to a line current measuring resistor, forms a circuit connected in parallel to the line, which regulating transistor determines a constant average value of voltage at the terminals of its main current path, characterized in that the power supply device comprises a variable current source connected in series to the light emitting diode, the ensemble of these two elements being connected in parallel to the main current path of the regulating transistor, and in that the variable current source is arranged for delivering a given maximum supply current when the average line current is equal to or higher than a first current threshold, for not delivering when the average line current is equal to or lower than a second current threshold, which is lower than the first threshold, and for delivering a variable supply current which varies with the average line current between the first and second current thresholds.

3. A circuit as claimed in claim 2, characterized in that the value of the current delivered by the variable current source is a linear function of the average line current between the first and second current thresholds.

4. A circuit as claimed in claim 3, characterized in that the variable current source comprises a current generator adjustable via the monitoring signal, which generator produces on its output a current called control current in a load resistor, and an amplifier of the transconductance type of which an input is coupled to the load resistor and which delivers on its output a current which forms the supply current of the light-emitting diode, which is proportional to said control current.

5. A circuit as claimed in claim 4, characterized in that it further comprises a comparator receiving on its input the value of the instantaneous voltage drop at the terminals of the variable current source, which voltage drop is compared to a voltage threshold, and in that the output of the comparator is coupled to a blocking device for blocking the variable current source, which causes the suppression of the current delivered by this variable current source, when the instantaneous voltage drop at the terminals of this current source is lower than said voltage threshold.

6. A circuit as claimed in claim 5, characterized in that the comparator is a hysteresis effect comparator and in that the blocking device is formed by said load resistor of which the voltage drop is canceled via the output of the comparator.

7. A circuit as claimed in claim 6, characterized in that it comprises a resistor connected in shunt to the terminals of the variable current source.

8. A telephone connected to a two-wire telephone line, comprising:

a rectifier bridge which has two terminals, each one connected to one of the wires forming the telephone line and a positive and a negative terminal between which the divider bridge delivers a positive voltage, a switch which has a first terminal connected to the positive terminal of the divider bridge and a second terminal, a module called interface module which has a first supply terminal connected to the negative terminal of the divider bridge, a second supply terminal connected to the second terminal of the switch and an output terminal intended to deliver a local supply voltage, which interface module is intended to transmit signals to the telephone line and therefore has an input terminal, a module called emitter module which has a first supply terminal connected to the negative terminal of the divider bridge and a second supply terminal connected to the output terminal of the interface module, and an output terminal intended to deliver a transmit signal, characterized in that the interface module comprises:

a circuit as claimed in claim 1, in which the current path of the regulating transistor, connected in series to the line current measuring resistor, forms a circuit inserted between the first and second supply terminals, the regulating transistor being controlled by the transmit signal coming from the transmitting module and received on the input terminal of the interface module, and a resistor and a capacitor connected in series between the first and second supply terminals, the node between the resistor and the capacitor forming the output terminal of the interface module.

9. A telephone connected to a two-wire telephone line, comprising:

a rectifier bridge which has two terminals, each one connected to one of the wires forming the telephone line, and a positive and a negative terminal between which the divider bridge delivers a positive voltage, a switch which has a first terminal connected to the positive terminal of the divider bridge and a second terminal, a module called interface module which has a first supply terminal connected to the negative terminal of the divider bridge, a second supply terminal connected to the second terminal of the switch and an output terminal intended to deliver a local supply voltage, which interface module is intended to transmit signals to the telephone line and therefore has an input terminal, a module called emitter module which has a first supply terminal connected to the negative terminal of the divider bridge and a second supply terminal connected to the output terminal of the interface module, and an output terminal intended to deliver a transmit signal, characterized in that the interface module comprises:

a circuit as claimed in claim 2, in which the current path of the regulating transistor, connected in series to the line current measuring resistor, forms a circuit inserted between the first and second supply terminals, the regulating transistor being controlled by the transmit signal coming from the transmitting module and received on the input terminal of the interface module, and a resistor and a capacitor connected in series between the first and second supply terminals, the node between the resistor and the capacitor forming the output terminal of the interface module.

10. A circuit in a device connected to a telephone line, the circuit comprising:

a light-emitting diode for an operation indicator;

a line current measuring resistor and a regulating transistor connected in series to said line current measuring resistor, the combination of said transistor and said resistor being connected in parallel to the line, and wherein the regulating transistor determines a constant average value of voltage at the terminals of its main current path;

a variable current source connected in series to the light-emitting diode, such that the combination of said light-emitting diode and said variable current source is connected in parallel to the regulating transistor;

and wherein the variable current source, upon receiving a monitoring signal derived from the voltage drop in the line current measuring resistor, delivers a supply current which has a given nominal value when the average line current is equal to or higher than a current threshold, and for not delivering current when the average line current is lower than said current thresholds.

11. A circuit in a device connected to a telephone line, the circuit comprising:

a light-emitting diode for an operation indicator;

a line current measuring resistor and a regulating transistor connected in series to said line current measuring resistor, the combination of said transistor and said resistor being connected in parallel to the line, and wherein the regulating transistor determines a constant average value of voltage at the terminals of its main current path;

a variable current source connected in series to the light-emitting diode, such that the combination of said light-emitting diode and said variable current source is connected in parallel to the regulating transistor;

and wherein the variable current source (a) delivers a given manimum supply current when the average line current is equal to or higher than a first current threshold, (b) does not deliver current when the average line current is equal to or lower than a second current threshold, said second current threshold being lower than said first current threshold, and (c) delivers a variable supply current which varies with the average line current between the first and second current thresholds.

* * * * *